J. B. OLIVER.
DIES FOR CUTTING BARBS FOR WIRE-FENCES.

No. 182,323. Patented Sept. 19, 1876.

UNITED STATES PATENT OFFICE.

JAMES B. OLIVER, OF LEET TOWNSHIP, (PITTSBURG P. O.,) ALLEGHENY COUNTY, PENNSYLVANIA.

IMPROVEMENT IN DIES FOR CUTTING BARBS FOR WIRE FENCES.

Specification forming part of Letters Patent No. 182,323, dated September 19, 1876; application filed August 18, 1876.

*To all whom it may concern:*

Be it known that I, JAMES B. OLIVER, of Leet township, county of Allegheny, State of Pennsylvania, have invented or discovered a new and useful Improvement in Wire-Fence-Barb Blanks and Dies; and I do hereby declare the following to be a full, clear, concise, and exact description thereof, reference being had to the accompanying drawing, making a part of this specification, in which—like letters indicating like parts—

Figure 1:
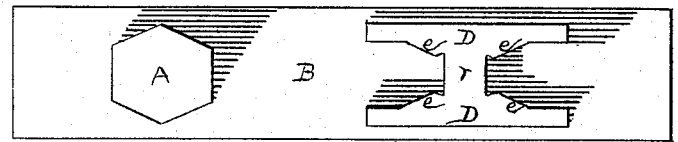
Figure 2:
Figure 3:
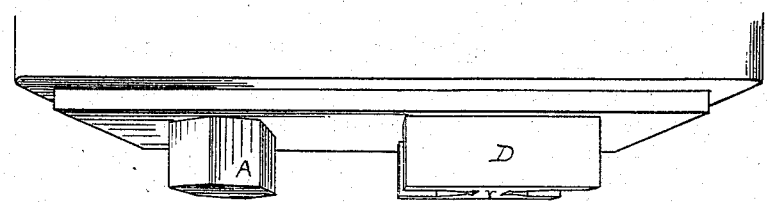
Figure 4:
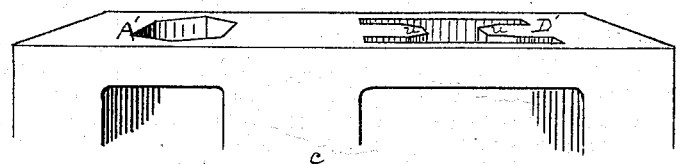
Figure 4:
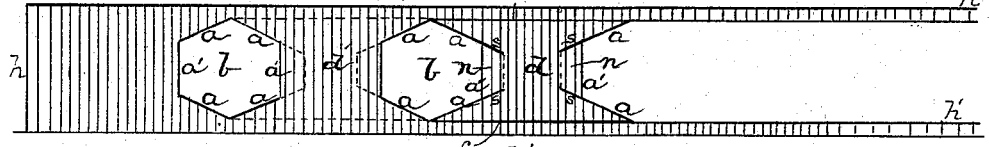
Figure 5:
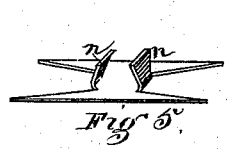
Figure 6:
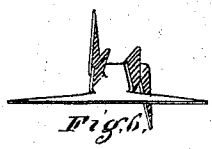

Figure 1 is an inverted face view of the male dies and follower employed in connection with my invention. Fig. 2 is a face view of the counter or female die. Fig. 3 shows both in perspective. Fig. 4 shows the operation of the dies on a hoop or strap in cutting and shaping the barb-blanks, of which Fig. 5 is a perspective view, and Fig. 6 shows the barb complete and ready for attachment to the wire.

A is a six-sided punching-die attached to a follower, B, and made so as when passing through the female die A' to shear, cut, or punch out a correspondingly-sized hole, $b$, in the hoop $h$. The follower B carries an H-shaped male cutting-die, D, which plays through the correspondingly-shaped female die D', so as in like manner to shear out the material between each two holes, $b$, as shown at $d$, Fig. 4, by full lines, and at $d'$ by dotted lines. These dies are made so that one shall reciprocate in the manner common in other kindred operations; and the distance between the male dies A D, as also between the female dies A' D', is such that at each stroke one blank, $d$, will be cut or sheared out, and a hole, $b$, cut or sheared out at the proper distance in advance for the shearing out of another blank, $d'$.

In making these blanks I propose to use the waste hoop ends of cotton-bale hoop manufacture, or other like waste hoop material, and cut the barb-blanks therefrom of a little less width. Such a hoop end is shown at $h$, and the edge strips, within which the blanks are cut, at $h'$. This excess of width enables me to feed the uncut blanks $d'$ under the die D at the same time that I feed the hoop $h$ forward for the punching of another hole, $b$. The male and female dies A A' at each stroke cut the end edges $a\ a\ a'$ of two contiguous blanks. The dies D D' shear the sides or edges $c\ c$ of the blank, so as to sever it completely from the parent hoop. The dies D D' have also shearing-edges $e\ e$, which at the same stroke operate to shear the edges $s\ s$ of two lips, $n\ n$, in the crotch formed by the sides $a\ a$ or the prongs of the blank. As soon as this shearing operation is performed (the die D continuing its motion) the blank $d$ is carried down through the female cavity D', and by the conjoint action of the cross-bar $r$ of the male die D and the abutments $u\ u$ of the female cavity D' the lips $n\ n$ are bent upward somewhat, as represented in Fig. 5, and the blank is discharged beneath the female die. Two of the prongs (one at each end) are then bent at right angles, as illustrated in Fig. 6, and the barb is ready for attachment to a wire, which is effected by closing the lips $n\ n$ around the wire.

This operation, as well as that of bending the prongs, may be effected by hand with suitable tools, or by machinery, or partly by one and partly by the other, and the prongs may be bent after attachment to the wire, if so preferred.

I make no claim herein to the barb complete, as shown in Fig. 6, as such product or article will form the subject-matter of a separate application. I have described and illustrated it here simply to show a mode of utilizing the blank.

I claim herein as my invention—

1. The combination of male and female hexagonal and H shaped male and female dies, with shearing-edges, substantially as and for the purposes set forth.

2. A barb-blank having four prongs and two intermediate turned-up lips, substantially as set forth, with reference to Fig. 5.

In testimony whereof I have hereunto set my hand.

JAMES B. OLIVER.

Witnesses:
J. J. McCORMICK,
GEORGE H. CHRISTY.